United States Patent
Farrell et al.

(10) Patent No.: US 8,290,260 B2
(45) Date of Patent: *Oct. 16, 2012

(54) METHOD AND SYSTEM FOR CREATING INTEGRATED REMOTE CUSTOM RENDERING PROFILE

(75) Inventors: Michael E. Farrell, Ontario, NY (US); Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 958 days.

This patent is subject to a terminal disclaimer.

(21) Appl. No.: 12/334,592

(22) Filed: Dec. 15, 2008

(65) Prior Publication Data

US 2010/0150438 A1 Jun. 17, 2010

(51) Int. Cl.
*G06K 9/00* (2006.01)
*G06K 9/34* (2006.01)

(52) U.S. Cl. ........................................................ 382/167

(58) Field of Classification Search .................. 382/154, 382/164, 165, 167, 254, 255, 276, 277; 358/1.6, 358/1.9, 2.1, 3.01, 515, 518; 345/581, 589, 345/590, 600; 709/238, 250
See application file for complete search history.

(56) References Cited

U.S. PATENT DOCUMENTS

| | | | |
|---|---|---|---|
| 7,724,977 B2 * | 5/2010 | Liege et al. ................... | 382/254 |
| 7,831,738 B2 * | 11/2010 | Rofougaran ................... | 709/250 |
| 8,014,027 B1 * | 9/2011 | Kulkarni et al. ............... | 358/1.9 |
| 8,036,450 B2 * | 10/2011 | Bertola et al. ................. | 382/154 |
| 2008/0259401 A1 * | 10/2008 | Farrell et al. ................... | 358/2.1 |
| 2008/0297814 A1 * | 12/2008 | Jacobs et al. ................... | 358/1.9 |
| 2009/0066710 A1 * | 3/2009 | Pathak ........................... | 345/581 |
| 2010/0150438 A1 * | 6/2010 | Farrell et al. ................... | 382/167 |

OTHER PUBLICATIONS

ICC Profiling Software & Measurement Device Bundles; www.colormanagement.com/store/CID25.
Color Management; http://en.wikipedia.org/wiki/Color_management.
Remote Custom ICC Printer Profiling Service; www.rpimaging.com/services/custom_icc_profiling.
Custom ICC Output Profiles; http://digitaldog.net/services.html.

* cited by examiner

*Primary Examiner* — Amir Alavi
(74) *Attorney, Agent, or Firm* — Luis M. Ortiz; Kermit D. Lopez; Kevin Soules

(57) ABSTRACT

A system and method for creating a remote custom rendering profile and automatically delivering and installing the resulting remote custom profile into a digital front end (DFE) in order to perform color management for a rendering device. A color test rendering job comprising color swatches with a number of additional information can be forwarded to a remote service provider and the test job can be scanned and the custom rendering profile can be generated utilizing a profiler application. The resultant rendering profile can then be electronically transferred back to the rendering device based on the additional information and can be installed without user intervention.

20 Claims, 4 Drawing Sheets

METHOD AND SYSTEM FOR CREATING INTEGRATED REMOTE CUSTOM RENDERING PROFILE

TECHNICAL FIELD

Embodiments are generally related to rendering devices and techniques. Embodiments also relate in general to the field of computers and similar technologies and, in particular, to software utilized in this field. In addition, embodiments relate to methods and systems for creating integrated remote custom rendering profiles.

BACKGROUND OF THE INVENTION

Image-rendering devices such as, for example, monitors, scanners, and printers, often impose distortions on the color characteristics of a rendered image. Hence, matching of color appearance between images and documents transferred among any combination of the digital image rendering devices requires the use of specialized color image processing knowledge regarding the color rendering characteristics associated with different imaging devices. A color management system (CMS) is necessary because different imaging devices have different color capabilities, describe color characteristics in varying terms, and operate among variable color spaces. Such systems generally depend upon standard data structures known as color profiles to determine how to process image pixels.

Photo-product production in retail environments is a significant business opportunity; however, such an environment is very cost sensitive and places a premium on ease-of-use for low-skilled operators. Maximizing the apparent color gamut is very important when producing image centric custom photo-products where end users generally compare the results to silver halide prints. ICC (International Color Consortium) profiles are a professional color management solution and follow an international and accepted standard to enable accurate printed color for all colors that the rendering devices can reproduce. In contrast, achieving accurate color via manual tweaking is nearly impossible due to the complex nature of the rendering device color response. ICC profiles offer the ability to manage color properly to ensure accurate output on various devices. Custom ICC printer profiles can dramatically improve the apparent color gamut of color rendering devices as compared to fleet profiles.

The creation of such custom ICC printer profiles requires the presence of an appropriate color-sensing instrument typically a spectrophotometer, ICC profile creation software, and the skill to execute such process. Although prices for such spectrophotometers and ICC printer profiling software have dropped over the years, the cost is still a barrier for creating custom ICC printer profile in many cost sensitive environments that make use of low skilled rendering device operators. Hence, it is difficult to justify the expense of acquiring the spectrophotometer and training users on the process for creating custom ICC printer profiles in such environment.

Based on the foregoing, it is believed that a need exists for an improved method and system for creating integrated remote custom ICC printer profiles, as described in greater detail herein. A need also exists for automatically delivering and installing the ICC printer profile for specific rendering devices.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for improved data-processing methods and systems.

It is another aspect of the present invention to provide for methods and systems for creating remote custom ICC printer profiles.

It is a further aspect of the present invention to provide for methods and systems for automatically delivering and installing an ICC printer profile for specific rendering devices.

The aforementioned aspects and other objectives and advantages can now be achieved as described herein. A system and method for creating a remote custom rendering profile and automatically delivering and installing the resulting rendering profile into a digital front end (DFE) in order to perform color management for a rendering device. One example of a remote custom rendering profile is an ICC printer profile, as described in greater detail herein. Thus, a remote custom ICC printer profile can be implemented via the system and methodology described herein. Note that as utilized herein, the acronym ICC generally refers to "International Color Consortium", an industry consortium, which has defined an open standard for a color-matching module (CMM) at the OS level, and color profiles for the devices and working space.

Color test rendering job comprising color swatches with a number of additional information can be forwarded to a remote service provider and the test job can be scanned and the custom ICC printer profile can be generated utilizing a profiler application. The resultant ICC profile can then be electronically transferred back to the rendering device based on the additional information and can be installed without user intervention.

The creation of the custom ICC printer profile for a specific media and color aim or emulation can be requested by a user. Such a request can be triggered by the introduction of a new media with color properties different than existing media, drift in the color response of the rendering device or a change in the desired color appearance of the test rendering job. The color test job can be extended to add human and machine-readable information to enable automated methods for delivery and installation of the resulting ICC printer profile back to the originating rendering device. The additional information includes machine serial number or MAC address for identifying the rendering device and instructions for delivery of the ICC profile to the customer and/or rendering device.

The delivery instructions can be envisioned to include direct delivery and install where the ICC printer profile can be transferred to the rendering device over a network without human intervention. The custom ICC printer profile can also be delivered through e-mail. Such direct delivery and install requires an IP address and network name to transfer the ICC printer profile to the rendering device. Such an approach annotates the color swatch test print job with the rendering device, media, and color aim information and automatically installs the custom ICC printer profile and associates the new ICC profile to the affected media without user intervention.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
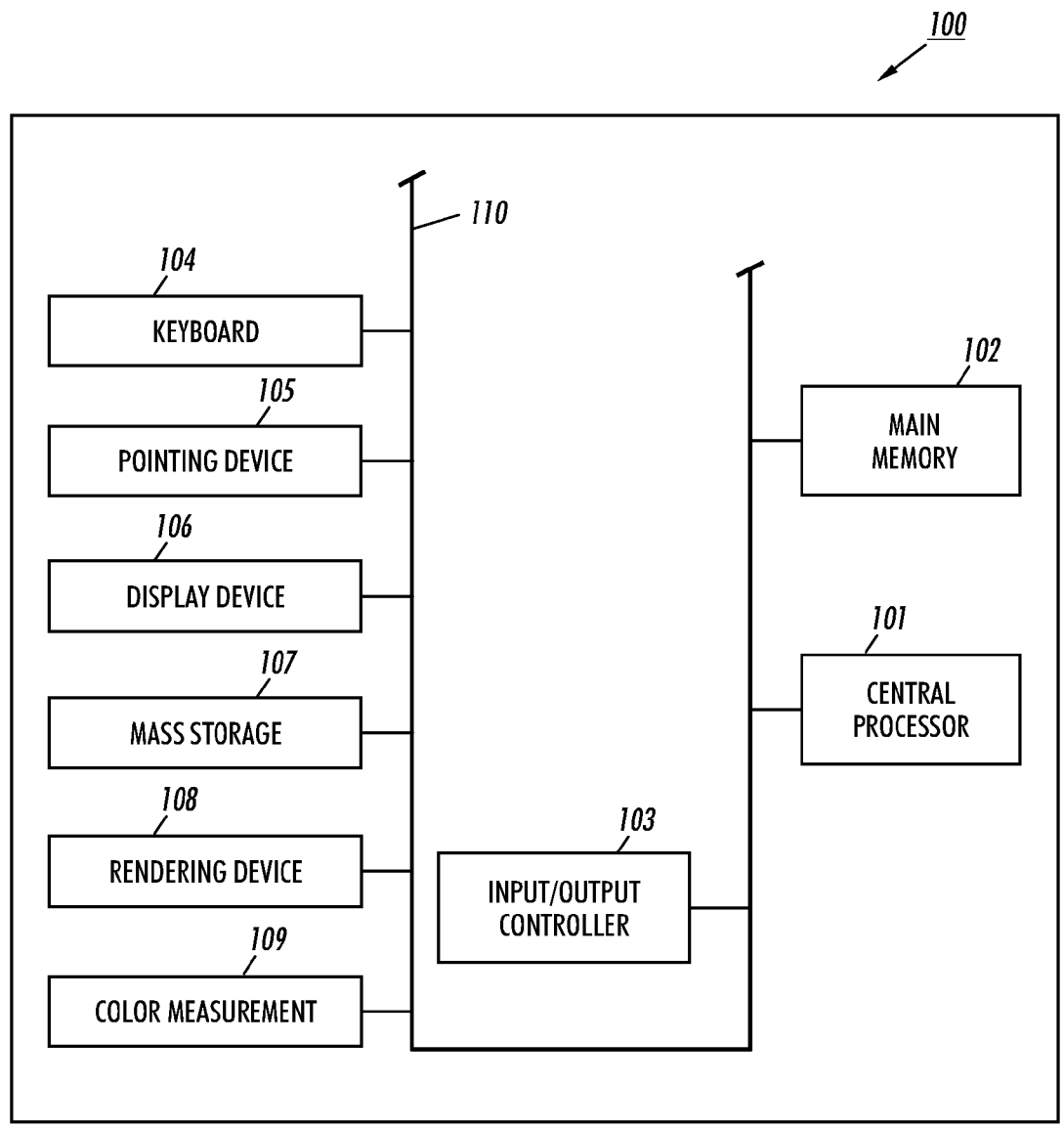
FIG. 1 illustrates a schematic view of a computer system in which the present invention may be embodied.
Figure 2:
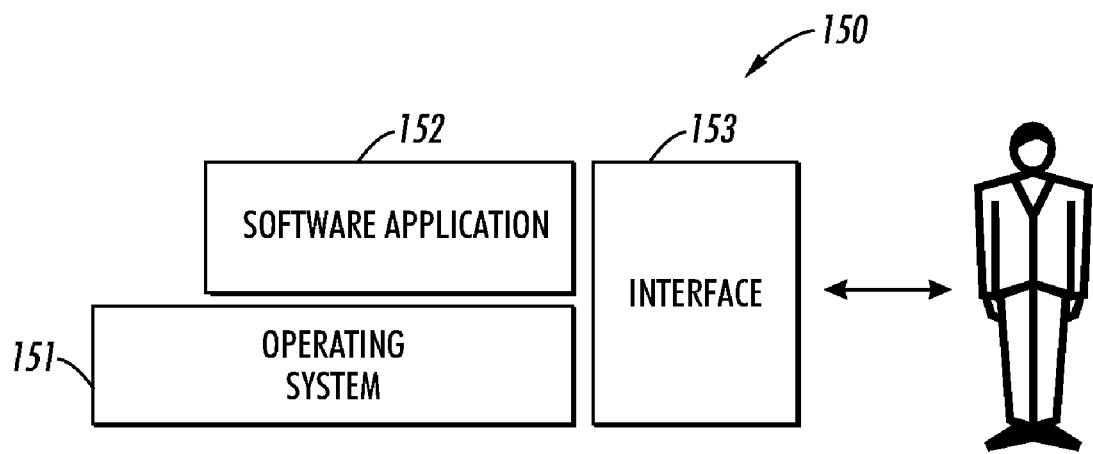
FIG. 2 illustrates a schematic view of a software system including an operating system, application software, and a user interface for carrying out the present invention.
Figure 3:
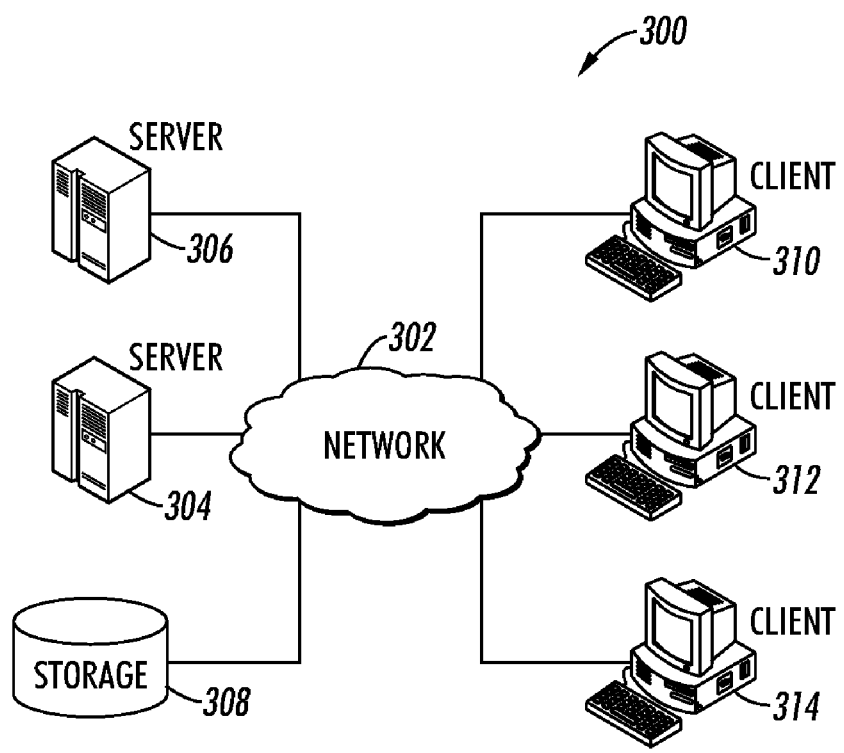
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates that the present invention may be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices such as a rendering device 108 may be utilized with the data-processing system 100 as desired. Other components may also be included as a part of system 100. For example, a color measuring instrument 109, such as a spectrophotometer, may be incorporated into system 100 (which may also be part of the scanner 435 of the remote entity 430 discussed later herein). As illustrated, the various components of the data-processing system 100 are capable of communicating electronically through a system bus 110 or similar architecture.

FIG. 2 illustrates a computer software system 150 provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems, such as Linux, UNIX, etc. Application module 152, on the other hand, can include instructions, such as the various operations described herein with respect to the various components and modules described herein such as, for example, the method 600 depicted in FIG. 6.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing system 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100, computer software system 150, data processing system 300, and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
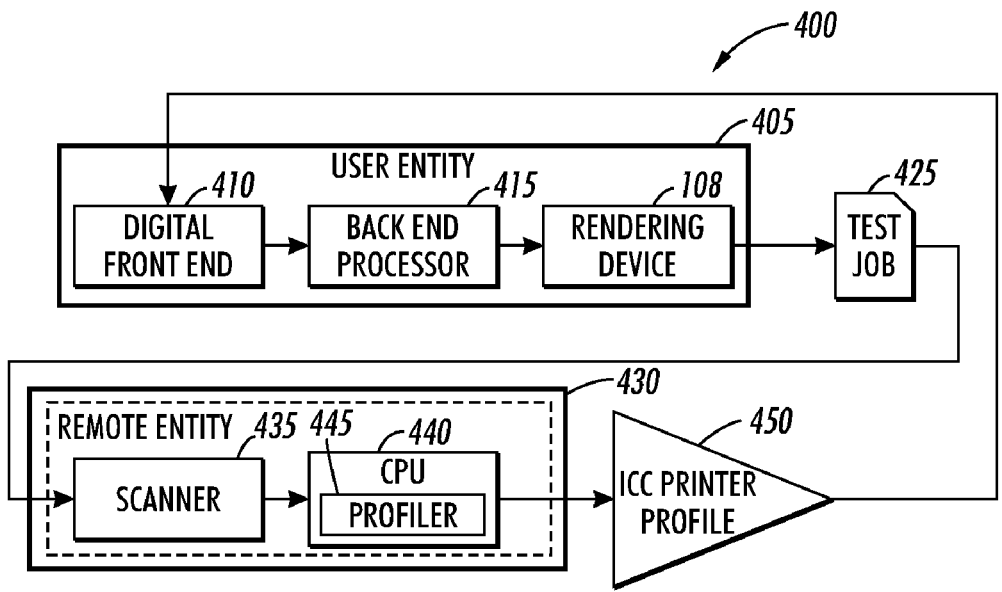
FIG. 4 illustrates a block diagram of a remote custom ICC printer profiling system, in accordance with a preferred embodiment.

FIG. 4 illustrates a block diagram of a remote custom ICC printer profiling system 400, in accordance with a preferred embodiment. Note that in FIGS. 1-6, identical or similar blocks are generally indicated by identical reference numerals. The remote custom ICC printer profiting system 400 generally includes a user entity 405 and a remote entity 430. The user entity 405 includes a digital front end (DFE) 410, a back end processor 415 and rendering device 108. Note that in FIGS. 1-4, identical or similar parts or elements are indicated by identical reference numerals. Rendering device 108 may constitute, for example, a printer, a copier, fax machine, scanner, and/or other types of rendering components, depending upon design considerations. The rendering device 108 can generate a test rendering job 425 based on request from a user of the rendering device 108 for the creation of a custom rendering profile, such as custom ICC printer profile 450, for a specific media type and color aim or emulation. Such request can be triggered by the introduction of a new media with color properties different from the existing media, a drift in the color response of the rendering device 108 or a change in the desired color appearance of the prints.

Figure 5:
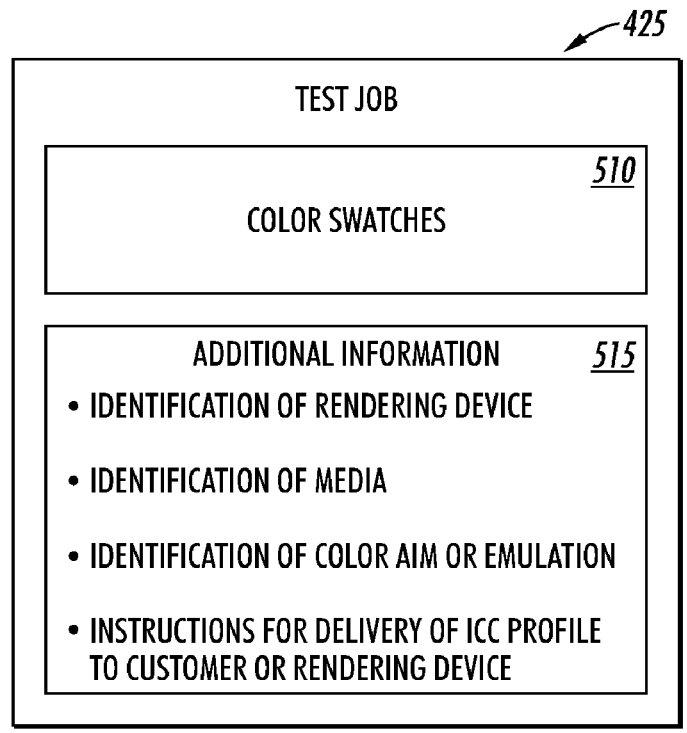
FIG. 5 illustrates an exemplary diagram of a test rendering job with additional information, which can be implemented in accordance with a preferred embodiment.

FIG. 5 illustrates an exemplary diagram of a test job 425 with additional information 515, which can be implemented in accordance with a preferred embodiment. The test-rendering job 425 typically includes a set of color swatches 510 and a number of additional information 515. The additional information comprises an identification of the rendering device 108 such as, for example, machine serial number or MAC address, an identification of the media, an identification of the color aim or emulation and a number of instructions for remote delivery of the ICC printer profile 450 to the rendering device 108. Note that the use of a machine serial number, MAC address, etc. as discussed above, are but one of many possible identifiers that could be utilized in accordance with the disclosed embodiments. For example, one may also use an identifier such as a DynDNS name or authentication credentials where the DFE logs into the service. In general, any number of possible identifiers may be utilized, including, for example, an URL.

Note that the test job 425 illustrated in FIG. 5 is described herein for exemplary purpose only and should not be interpreted in a limiting manner. The test job 425 containing the color swatches 510 with the additional information 515 can then be forwarded to the remote entity 430 for generation of the custom ICC printer profile 450. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

The International Color Consortium (ICC) created a standardized system for describing the color-rendering capabilities of any device such as the rendering device 108. The ICC profile defines the gamut of the device and a measure of the color distortion. The ICC profile actually has two components, the first element contains hardware data about the device and the second element is the calorimetric device characterization data that defines the manner in which the device establishes color. The typical custom profile can be produced by comparing measured color values against reference values. For example, a scanner profile can be produced by scanning the test color job, wherein the profiling application converts the scanned data into device independent values.

The remote entity 430 includes a scanner 435 and a central processing unit (CPU) 440, which comprises a profiler application 445. The computer or CPU 440 is the processing and memory means for the system 400 and is interconnected to the various components, which may include any number of image source devices such as a digital camera, internet access, DVD, and CD-ROM. The profiler application 445 is an application program, which performs custom ICC printer profiling and generates the custom ICC printer profile 450.

The ICC printer profile 450 includes data and information that can be utilized by the digital processing schemes to make the color reproductions. In general, profiling, also called characterizing or describing, is really a description of the color capabilities of the device such as the rendering device 108. Profiling measures the device properties and transforms the properties into some usable form as part of a color management system. Profiling does not change the behavior of the device as with calibration, but rather compliments the calibration. Such an approach, however, does not preclude the need to calibrate individual devices to ensure that the process that created the characterization remains consistent.

The scanner 435 scans the test job 425 in order to produce a digitized print target image. The profiler application 445 can be utilized to determine the full color range capabilities of the rendering device 108. The gamut of the device 108 can be determined by measuring the calorimetric values for a set of known color patches or targets. The corrected digital print target data can then be processed by the CPU 440 wherein the software application 445 compares the color space values of the print target data to a color space value of some reference target. Based on this comparison, device dependent correction profile data can be calculated and stored and can be utilized as the ICC printer profile 450. The profiles 450 can then be applied to an image data to compensate for any transformation inaccuracies.

The ICC printer profile 450 can be electronically transferred to the DFE 410 and can be installed after creating the ICC profile 450 utilizing the remote entity 430, without any mandatory user intervention. The back end processor 415 then decompresses the compressed bitmap data provided from the DFE 410 to practically restore the original bitmap data and transfers the data to the rendering device 108. If uncompressed bitmap data is provided from the DFE 410, then the back end processor 415 transfers the original bitmap data to the rendering device 108.

Figure 6:
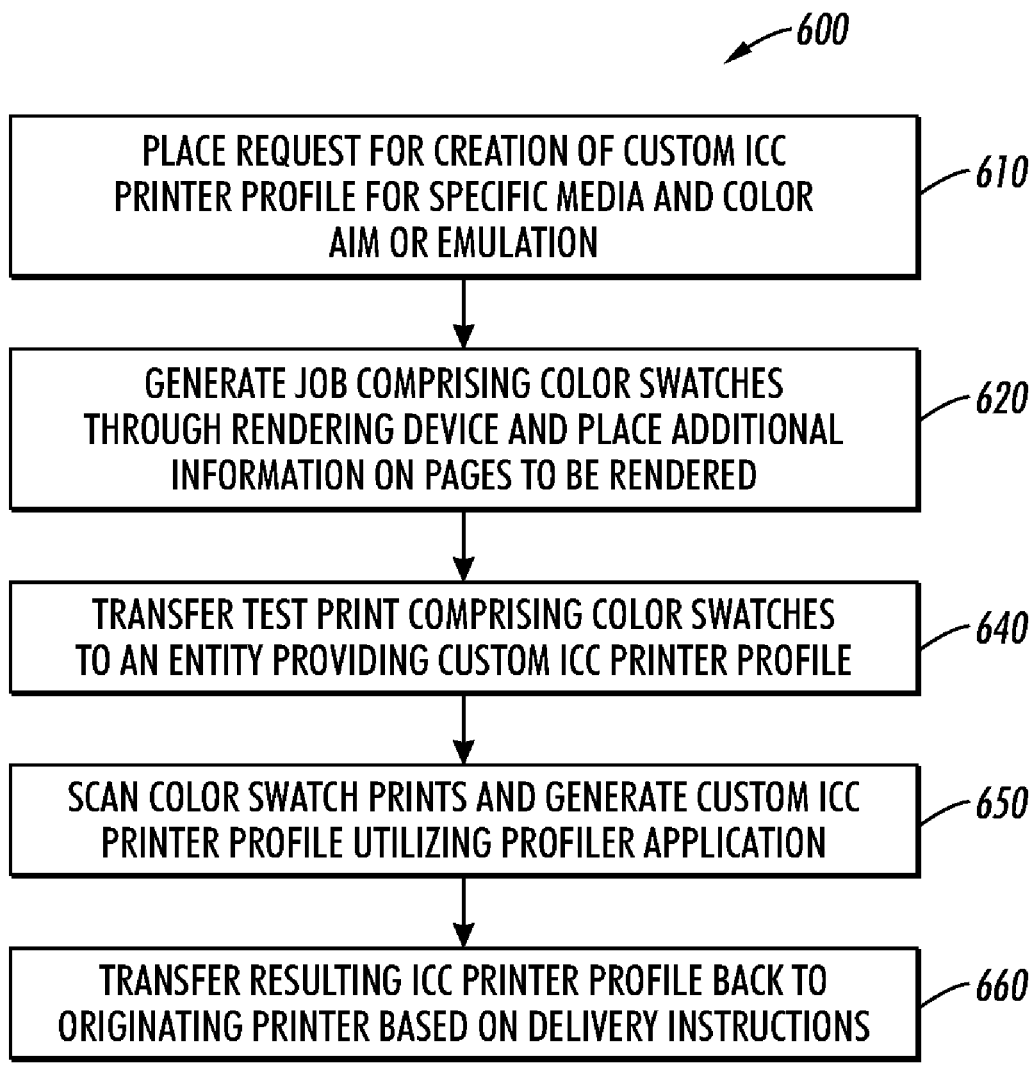
FIG. 6 illustrates a high level flow chart of operations illustrating logical operational steps of a method for creating integrated remote custom ICC printer profile and automatically delivering and installing the resulting ICC printer profile into a DFE, in accordance with a preferred embodiment.

FIG. 6 illustrates a high level flow chart of operations illustrating logical operational steps of a method 600 for creating integrated remote custom ICC printer profile 450 and automatically delivering and installing the resulting ICC printer profile 450 into the DFE 410, in accordance with a preferred embodiment. Note that the method 600 can be implemented in the context of a computer-useable medium that contains a program product. The method 600 depicted in FIG. 6 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 600 described herein can be deployed as process software in the context of a computer system or data-processing system as that depicted in FIGS. 1-3.

A request for the creation of the custom ICC printer profile 450 for a specific media and color aim or emulation can be placed, as depicted at block 610. The test job 425 comprising color swatches 510 can be generated, as illustrated at block 620, and if necessary, additional information 515 can be placed on the pages to be generated through the rendering device 108. Such human and machine readable additional information enable reliable and automated methods for delivery and installation of the resulting ICC printer profile 450 back to the originating rendering device 108.

The additional information 515 generally includes unique identification schemes such as an identification of the printer, a machine serial number or a MAC address. Note that as utilized herein, the acronym MAC generally refers to "Media Access Control" and the MAC address usually encodes the manufacturer's registered identification number. The additional information can also include an identification of the media, an identification of the color aim or emulation and a number of instructions for delivery of the ICC profile 450 to the rendering device 108.

Such delivery instructions can be envisioned to include direct delivery and install where the ICC profile 450 can be transferred to the rendering device 108 over the network without human intervention. The custom ICC printer profile 450 can also be delivered through e-mail. The direct delivery and install requires an IP address or a network name to transfer the ICC profile 450 to the rendering device 108. Such additional information may be encoded for machine readability and/or human readability utilizing a variety of encoding schemes. Machine-readable encoding formats may include a number of 2D or 3D bar codes or data glyphs.

The test print 425 comprising color swatches 510 can be transferred to the remote entity 430 in order to provide custom ICC printer profile 450, as depicted at block 640. Such a service can be provided by a third party, or more likely, a subcontractor. Thereafter, the assigned color swatch prints can be scanned by the scanner 435 and the custom ICC printer profile 450 can be generated utilizing profiler application 445, as depicted at block 650. Finally, the resulting ICC printer profile 450 can be transferred back to the originating printer 108 as per the delivery instructions provided, as illustrated at block 660. When direct delivery and install is selected, the custom ICC printer profile 450 can be placed in the same directory with existing ICC printer profiles and the media attributes can be revised to associate the new custom ICC printer profile 450 with the applicable media.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It is believed that by utilizing the system and approach described herein, the concerns of cost and operator skill level associated with custom ICC printer profiling can be addressed and ICC printer profiles can be provided without requiring the owner/operator of the rendering device to own or use a color measuring device or perform any manual steps to install such custom ICC printer profile. The system 400 described herein also can be adapted for hands free operation where the operator does not have to do anything once they hand over the color swatch test job to a courier service and don't need to know how to operate the spectrophotometer or profiler application software. The method 600 for generating custom ICC printer profile can be equally applicable to subscription services where customers buy custom ICC printer profile via a subscription model.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for creating an integrated remote custom rendering profile, comprising:
generating, via a rendering device, a test rendering job that includes a plurality of color swatches and placing additional information on said test rendering job in an encoded format;
transferring said test rendering job including said plurality of color swatches to a remote service provider that subsequently scans said test rendering job in order to generate a custom rendering profile thereof; and
automatically delivering and installing said custom rendering profile into a digital front end that performs color management on behalf of said rendering device based on said additional information without user intervention, thereby providing for the remote creation of said custom rendering profile.

2. The method of claim 1 wherein said custom rendering profile comprises an ICC profile format.

3. The method of claim 1 further comprising configuring said custom rendering profile for a specific type of media.

4. The method of claim 1 further comprising configuring said custom rendering profile for a particular color emulation.

5. The method of claim 1 further comprising configuring said additional information to comprise at least one of the following types of information:
an identification of said rendering device;
an identification of a particular type of media;
an identification of a particular type of color emulation; and
instructions for delivering said custom rendering profile to said rendering device.

6. The method of claim 5 wherein said identification of said rendering device comprises an identifier indicative of said rendering device.

7. The method of claim 5 further comprising:
directly delivering and installing said custom rendering profile to said rendering device over a network without human intervention utilizing an identifier indicative of said rendering device.

8. The method of claim 1 further comprising encoding said additional information for machine readability and human readability utilizing at least one encoding scheme among a variety of encoding schemes.

9. The method of claim 1 further comprising transferring said custom rendering profile via a subscription model.

10. A method for creating an integrated remote custom rendering profile, comprising:
generating, via a rendering device, a test rendering job that includes a plurality of color swatches and placing additional information on said test rendering job in an encoded format;
transferring said test rendering job including said plurality of color swatches to a remote service provider that subsequently scans said test rendering job in order to generate a custom rendering profile thereof, wherein said custom rendering profile comprises an ICC profile format;
automatically delivering and installing said custom rendering profile into a digital front end that performs color management on behalf of said rendering device based on said additional information without user intervention; and
transferring said custom rendering profile via a subscription model, thereby providing for the remote creation of said custom rendering profile.

11. The method of claim 10 further comprising encoding said additional information for machine readability and human readability utilizing at least one encoding scheme among a variety of encoding schemes.

12. A system for creating an integrated remote custom rendering profile, said system comprising:
a processor;
a data bus coupled to the processor; and
a computer-usable medium embodying computer code, the computer-usable medium being coupled to the data bus, the computer program code comprising instructions executable by the processor and configured for:
generating, via a rendering device, a test rendering job that includes a plurality of color swatches and placing additional information on said test rendering job in an encoded format;
transferring said test rendering job including said plurality of color swatches to a remote service provider that subsequently scans said test rendering job in order to generate a custom rendering profile thereof; and
automatically delivering and installing said custom rendering profile into a digital front end that performs color management on behalf of said rendering device based on said additional information without user intervention, thereby providing for the remote creation of said custom rendering profile.

13. The system of claim 12 wherein said custom rendering profile comprises an ICC profile format.

14. The system of claim 12 wherein said computer program code further comprises instructions for configuring said custom rendering profile for a specific type of media.

15. The system of claim 12 wherein said computer program code further comprises instructions for configuring said custom rendering profile for a particular color emulation.

16. The system of claim 12 wherein said computer program code further comprises instructions for configuring said additional information to comprise at least one of the following types of information:
an identification of said rendering device;
an identification of a particular type of media;
an identification of a particular type of color emulation; and
instructions for delivering said custom rendering profile to said rendering device.

17. The system of claim 16 wherein said identification of said rendering device comprises an identifier indicative of said rendering device.

18. The system of claim 16 wherein said computer program code further comprises instructions for directly delivering and installing said custom rendering profile to said rendering device over a network without human intervention utilizing an identifier indicative of said rendering device.

19. The system of claim 12 wherein said computer program code further comprises instructions for encoding said additional information for machine readability and human readability utilizing at least one encoding scheme among a variety of encoding schemes.

20. The system of claim 12 wherein said computer program code further comprises instructions for transferring said custom rendering profile via a subscription model.

* * * * *